United States Patent
Marchand et al.

(10) Patent No.: US 11,792,461 B2
(45) Date of Patent: Oct. 17, 2023

(54) METHOD FOR MANAGING THE READING OF A DIGITAL CONTENT ITEM WITHIN A MULTIMEDIA CONTENT READER TERMINAL CONNECTED TO A RENDERING DEVICE

(71) Applicant: ORANGE, Issy-les-Moulineaux (FR)

(72) Inventors: Hervé Marchand, Chatillon (FR); Mathieu Rivoalen, Chatillon (FR)

(73) Assignee: ORANGE, Issy les Moulineaux (FR)

( * ) Notice: Subject to any disclaimer, the term of this patent is extended or adjusted under 35 U.S.C. 154(b) by 76 days.

(21) Appl. No.: 17/350,338

(22) Filed: Jun. 17, 2021

(65) Prior Publication Data
US 2021/0400326 A1 Dec. 23, 2021

(30) Foreign Application Priority Data
Jun. 18, 2020 (FR) ...................... 2006352

(51) Int. Cl.
*H04N 21/2662* (2011.01)
*H04N 21/438* (2011.01)
(Continued)

(52) U.S. Cl.
CPC ....... *H04N 21/2662* (2013.01); *H04N 21/232* (2013.01); *H04N 21/2665* (2013.01); *H04N 21/2743* (2013.01); *H04N 21/4384* (2013.01)

(58) Field of Classification Search
CPC ............. H04N 21/2662; H04N 21/232; H04N 21/2665; H04N 21/2743; H04N 21/43635;
(Continued)

(56) References Cited

U.S. PATENT DOCUMENTS 9,253,229 B1 2/2016 Strothmann et al.
10,425,454 B2 9/2019 Conan et al.
(Continued)

FOREIGN PATENT DOCUMENTS

EP 3193497 A1 7/2017
EP 3393131 A1 10/2018
(Continued)

OTHER PUBLICATIONS

French Search Report and Written Opinion dated Oct. 30, 2021 for French Application No. 2006352, filed Jun. 18, 2020.
(Continued)

*Primary Examiner* — Robert J Hance
(74) *Attorney, Agent, or Firm* — David D. Brush; Westman, Champlin & Koehler, P.A.

(57) ABSTRACT

A method for managing streaming of a digital content item within a multimedia content reader terminal, from a communication network. The multimedia content reader terminal is able to be a content source of a rendering terminal. The rendering terminal has a plurality of selectable digital content sources. The method includes the following steps which are executed when the content reader terminal is selected as digital content source, called first source: detecting, during reading of a first content item by the reader terminal, selection of a source, called second source, other than the first source; reading and rendering a second content item originating from the second source instead of the first content item; and the detection step triggering a step of modifying the operation of the reader terminal in connection with the reading of the first content item.

8 Claims, 3 Drawing Sheets

(51) Int. Cl.
  *H04N 21/232* (2011.01)
  *H04N 21/2665* (2011.01)
  *H04N 21/2743* (2011.01)

(58) Field of Classification Search
  CPC ......... H04N 21/44209; H04N 21/4622; H04N 21/8456; H04N 21/23439; H04N 21/44218
  See application file for complete search history.

(56) References Cited

U.S. PATENT DOCUMENTS

| | | | |
|---|---|---|---|
| 2006/0222015 A1 | 10/2006 | Kafka et al. | |
| 2006/0225106 A1 | 10/2006 | Bedingfield | |
| 2007/0142082 A1* | 6/2007 | DaCosta | H04N 21/4384 |
| | | | 348/E5.127 |
| 2008/0304520 A1* | 12/2008 | Hannuksela | H04L 12/189 |
| | | | 370/498 |
| 2010/0118697 A1* | 5/2010 | Shumate | H04L 47/11 |
| | | | 370/230 |
| 2011/0317071 A1 | 12/2011 | McRae | |
| 2013/0046849 A1* | 2/2013 | Wolf | H04L 67/568 |
| | | | 709/217 |
| 2014/0368740 A1* | 12/2014 | Roberts | G06F 13/4282 |
| | | | 348/705 |
| 2015/0089544 A1* | 3/2015 | Kim | H04N 21/47214 |
| | | | 725/38 |
| 2015/0341411 A1 | 11/2015 | Huber et al. | |
| 2017/0070551 A1* | 3/2017 | Phillips | H04N 21/44209 |
| 2018/0234637 A1 | 8/2018 | Marino et al. | |

FOREIGN PATENT DOCUMENTS

| | | | | |
|---|---|---|---|---|
| FR | 3081647 A1 | 11/2019 | | |
| WO | WO-2010110241 A1 * | 9/2010 | ......... | H04N 21/4384 |
| WO | WO-2014067566 A1 * | 5/2014 | ......... | H04N 21/4384 |
| WO | 2015150684 A1 | 10/2015 | | |
| WO | WO-2018005835 A1 * | 1/2018 | ........... | H04N 21/235 |

OTHER PUBLICATIONS

English translation of the Written Opinion dated Oct. 30, 2021 for French Application No. 2006352, filed Jun. 18, 2020.

* cited by examiner

[Fig. 1]
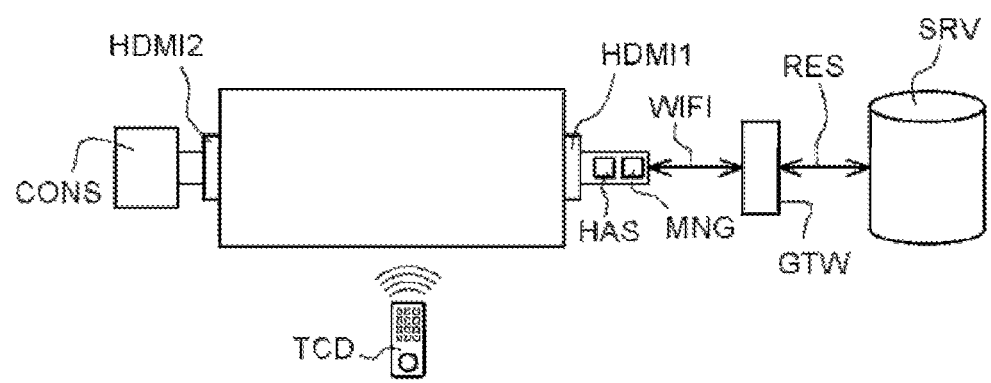
[Fig. 2]
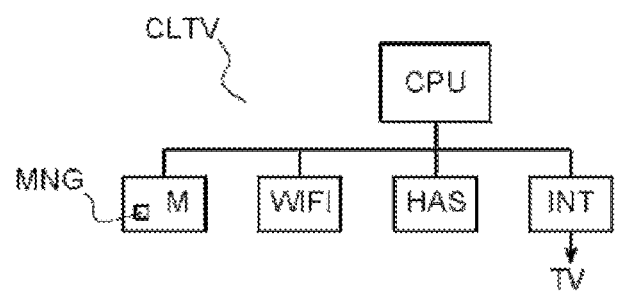
[Fig. 6]
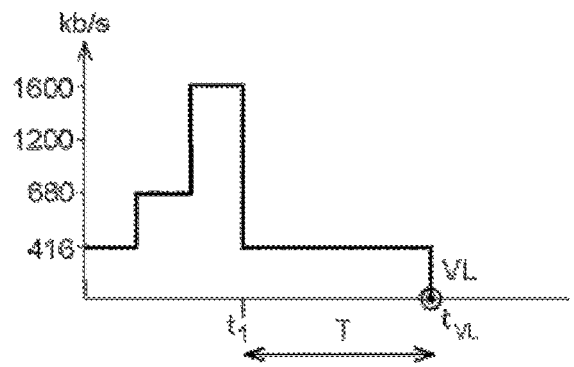

[Fig. 3]
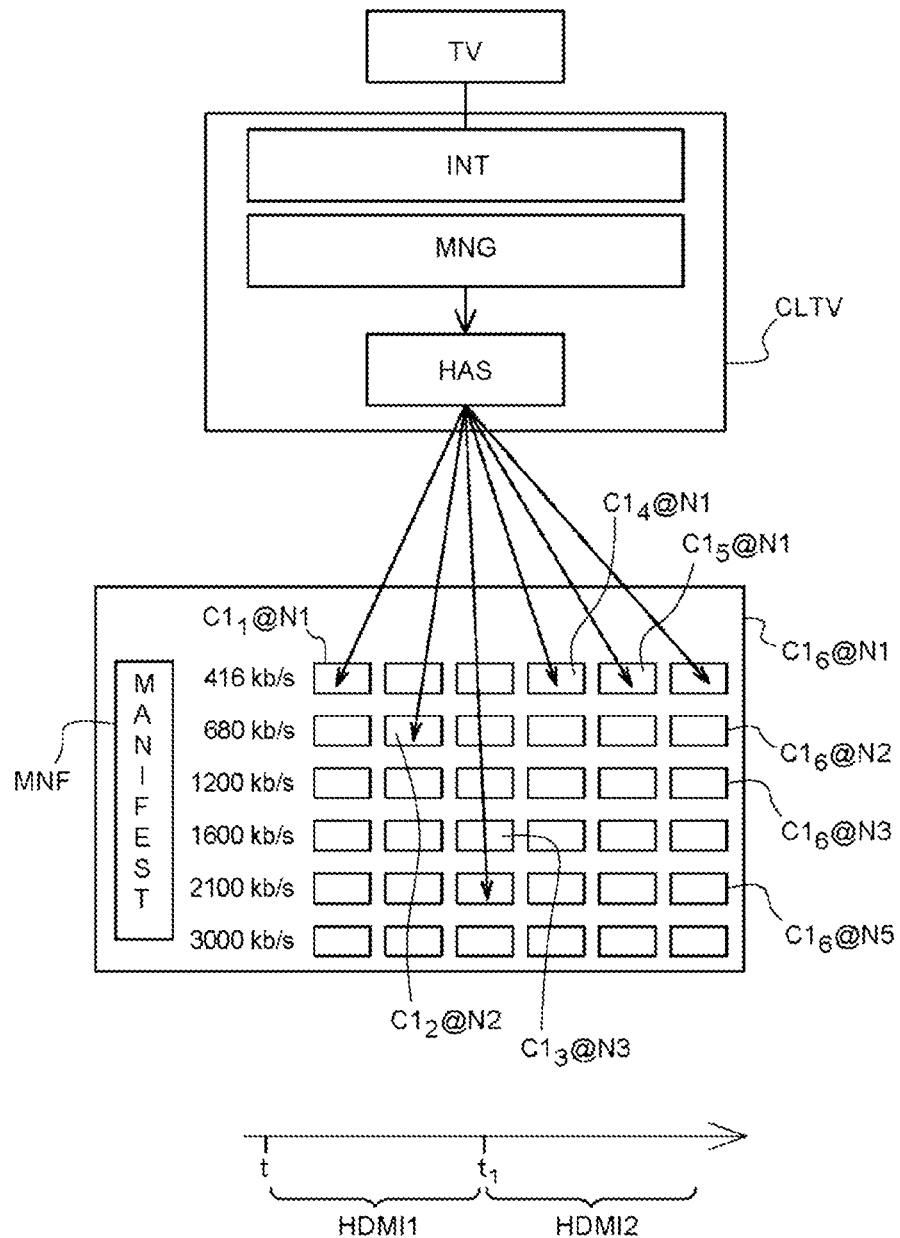

[Fig. 4]
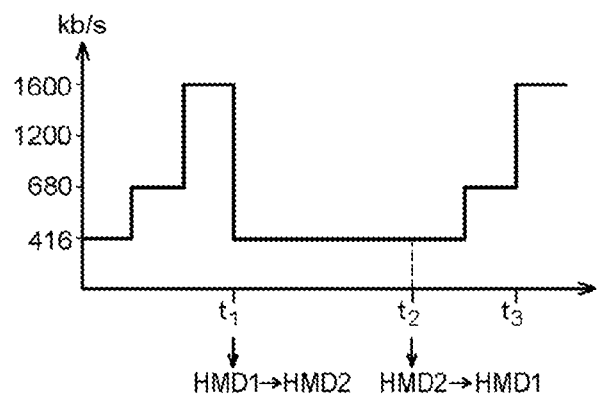
[Fig. 5]
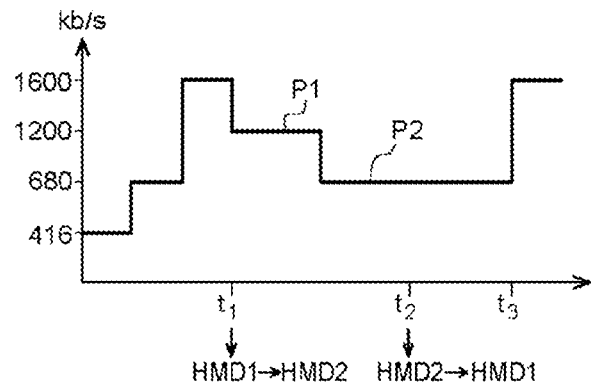

METHOD FOR MANAGING THE READING OF A DIGITAL CONTENT ITEM WITHIN A MULTIMEDIA CONTENT READER TERMINAL CONNECTED TO A RENDERING DEVICE

TECHNICAL FIELD

The field of the invention is that of digital multimedia content items, specifically digital audio and/or video content items.

More precisely, the invention relates to a method for managing the reading of a digital content item within a multimedia content reader terminal connected to a rendering device.

The rendering device is a device capable of rendering multimedia content items. This rendering device has at least two data sources.

A data source concerns a device capable of supplying a content item to be rendered on the rendering terminal. The content reader terminal is a data source. Other data sources are for example a games console, a hard disk, a computer, etc.

A data source may be connected to the rendering device via a port, such as an HDMI connection port, a USB port, etc.

It will be seen in one exemplary embodiment described below that the multimedia content reader terminal chosen to illustrate the invention is a digital television decoder (or set-top box); the decoder concerned here is capable of requesting access to a content item having a plurality of available qualities. Such content items are for example content items used in an HTTP adaptive streaming (HAS) context in which the content items are divided into segments, each segment being available with a plurality of encoding bit rates associated with respective rendering qualities.

BACKGROUND

Access to a multimedia content item, such as television or video on demand, over the Internet is nowadays possible for the majority of multimedia content reading terminals.

The reading terminal, for example a decoder, generally transmits a request to a server by indicating a chosen multimedia content item. The decoder in turn receives the requested multimedia content item. In the context of a local area communication network, such a request transits via an access gateway for accessing the network, for example a residential/home gateway.

The reading terminal is designed to receive these digital content items in the form of multimedia data and to request rendering on a rendering device. This rendering consists in supplying, in the reading terminal, the digital content item to the rendering terminal in a form accessible to the user. For example, received data corresponding to a video are generally decoded by the content reading device and then rendered in the reading terminal in the form of a display of the corresponding video with its associated soundtrack. Hereinafter, for the sake of simplification, the digital content item will be assimilated to a video and the rendering by the terminal, or consumption by the user of the terminal, will be assimilated to viewing this video on the screen of the terminal.

The broadcasting of digital content items over the Internet is often based on client-server protocols of the HTTP (HyperText Transport Protocol) family. In particular, streaming of digital content items allows the data to be transported and consumed in real time, that is to say that the digital data are transmitted over the network and decoded by the terminal as they arrive. The reading terminal receives and stores some of the digital data in a buffer memory before commanding rendering on the rendering terminal. This distribution mode is particularly useful when the bit rate available to the user is not guaranteed for the real-time transfer of the video.

HTTP adaptive streaming, abbreviated HAS, in addition allows data to be broadcast and received with various image qualities corresponding for example to various encoding bit rates. These various qualities are described in a parameter file available to download from a data server, for example a content server. When the content reading terminal wishes to access a content item, this description file makes it possible to select an image quality for the content item to be consumed depending on the available bandwidth or on the storage and decoding capacities of the client terminal. This type of technique makes it possible in particular to take into consideration variations in the bandwidth on the link between the reading terminal and the content server.

There are a number of technical solutions allowing streaming of such a content item to be facilitated, such as for example the proprietary solutions Microsoft® Smooth Streaming, Apple® HLS, Adobe® HTTP Dynamic Streaming or even the MPEG-DASH standard of the organization ISO/IEC, which will be described below. These methods propose to address, to the reading terminal, one or more intermediate description files, also called documents or manifests, containing the addresses of the various segments with the various qualities of the multimedia content item.

Thus, the MPEG-DASH (Dynamic Adaptive Streaming over HTTP) standard is a standard format for audiovisual broadcasting over the Internet. This standard is based on the preparation of the content item into various versions of variable encoding bit rate and quality, said versions being divided into segments of short duration (of the order of a few seconds), which are also called chunks. Each of these segments is made available by way of an exchange protocol. The protocol that is mainly targeted is the HTTP protocol, but other protocols (for example FTP) may also be used. The organization of the segments and the associated parameters are published in a manifest in XML format.

The principle underlying this standard is that the MPEG-DASH client estimates the bandwidth available to receive segments, and, depending on how full its reception buffer is, chooses, for the next segment to be streamed, a version whose encoding bit rate ensures the best possible image quality, and allows a reception delay compatible with uninterrupted rendering of the content item on a rendering device.

Thus, to adapt to variation in network conditions, in particular in terms of bandwidth, existing adaptive streaming solutions allow the reading terminal to change from one version of the content item encoded with a certain bit rate to another encoded with another bit rate during the streaming. Specifically, each version of the content item is divided into segments of the same duration. To allow continuous rendering of the content item on the terminal, each segment has to reach the reading terminal before its scheduled rendering time. The perceived quality associated with a segment increases with the size of the segment, expressed in bits, but at the same time, larger segments require a longer transmission time, and therefore have a higher risk of not being received in time for the content item to be rendered without interruption.

The reading terminal therefore has to find a compromise between the overall quality of the content item and the need to render it without interruption, by carefully selecting the next segment to be streamed from among the various proposed encoding bit rates. Algorithms for selecting the quality of the content item depending on the available bandwidth, and which may employ strategies of greater or lesser aggressiveness or greater or lesser security, exist to this end.

The consumption of digital content items via HTTP adaptive streaming (HAS) is tending to become more common. HAS is used in particular by many streaming services, but also by certain TV decoders, or set-top boxes, which use it to access delinearized content items such as video on demand (VOD), to replay television programs, or even to provide services such as Network PVR (Network Personal Video Recorder, i.e. a service for recording digital content items, the recording being performed by the content provider itself rather than in the home of the end user).

Furthermore, other devices, such as real-time multimedia content reader apparatuses, also access digital content items such as real-time (or live) television content items in adaptive streaming mode. This is the case for example for the Chromecast® apparatus developed by Google® or for CléTV® by Orange®.

Such apparatuses are conventionally connected to the HDMI port of a television set and form a data source for the television set. These apparatuses communicate, via a Wi-Fi® connection, with another apparatus of the home communication network (home gateway, computer, smartphone, tablet, etc.) that is connected to a wide area communication network such as the Internet, in order to render, on the rendering device, in this case a television set, the received multimedia content item through a compatible software application. These apparatuses will be referred to below using the generic designation HDMI key.

Such apparatuses may also be used to access video-on-demand content items, or to render personal content items stored in the home network, such as a video of a last holiday or a last family event, on the television set.

More often than not, electric power is supplied to the HDMI key via a USB connection between the television set or the HDMI key, the television set being connected to the mains. In the latter case, the operation of such apparatuses is therefore uninterrupted, insofar as they are not generally equipped with on/off switches. This is all the more true when they are connected to an external power source. Specifically, the user will naturally turn off their television or put it into standby, but will not disconnect their HDMI key from the mains, so as to access the content item without any delay linked to the restarting of the HDMI key when the television is powered on again.

However, what are known as "live" digital content items, i.e. corresponding to real-time television programs, do not by nature have a predefined duration or end date. As a result, if the end user does not explicitly stop the broadcasting of these content items, for example by explicitly stopping the broadcasting of the content item on the HDMI key (for example by returning to the homepage) or by interrupting its electric power supply, these may be played indefinitely by the key even if the television set is turned off and therefore is not displaying any content on its screen, or even when the HDMI port to which the HDMI key is connected is not selected on the television set. This therefore results in constant and needless consumption of the bandwidth resources of the wide area communication network of the Internet access provider and possibly within the local area communication network if the key communicates with the wide area communication network via a local area network.

This problem also occurs when the user changes HDMI source in order to use an apparatus other than the HDMI key, for example a games console. In this case, if a user uses a reading terminal on a television set and changes HDMI source so as to use another data source thereof, the reading terminal, if it has not been put into standby, will continue to read the content item and will therefore consume energy and bandwidth.

SUMMARY

An exemplary embodiment of the present application aims to improve the situation.

To this end, according to a functional aspect, an exemplary embodiment of the invention relates to a method for managing the streaming of a digital content item within a multimedia content reader terminal, from a communication network, said multimedia content reader terminal being able to be a content source of a rendering terminal, said rendering terminal having a plurality of selectable digital content sources, characterized in that it comprises the following steps, when the content reader terminal is selected as digital content source, called first source, a step of detecting, during reading of a first content item by the reader terminal, selection of a source, called second source, other than the first source, followed by a step of reading and rendering a second content item originating from the second source instead of the first content item, the detection step triggering a step of modifying the operation of the reader terminal in connection with the reading of the first content item.

According to an exemplary embodiment of the invention, when a first content item, coming from the multimedia stream reader terminal used as content source by the rendering terminal, is rendered on the rendering terminal and, during this rendering, a source other than the current source is selected and another content item, called second content item, is read and rendered, a management entity, rather than leaving the multimedia content reading terminal to carry on reading the first content item by selecting an encoding bit rate on the basis of the bandwidth available on the link between the client terminal and the content server, will command the reading terminal to use a bit rate independently of the bandwidth available for reading the first content item.

By virtue of an exemplary embodiment of the invention, although it is not selected as data source, the stream reader terminal carries on reading the first content item with a given quality, preferably of low quality as explained below; in addition, due to the fact that reading is carried on, the stream reader terminal is ready to render the content item in the event of the reader terminal subsequently being selected as data source.

The technical effect offered by an exemplary embodiment of the invention is at least twofold. First of all, by selecting a low encoding bit rate, an exemplary embodiment of the invention offers a saving in terms of bandwidth due to the use of a low image quality. Second of all, an exemplary embodiment of the invention offers a much smaller waiting period in comparison with the prior art due to the fact that the reader terminal is currently reading the first content item and is therefore ready to render the first content item. User experience can only be satisfactory.

According to a first particular mode of implementation of the invention, with the first content item having a plurality of available encoding bit rates associated with respective rendering qualities, the modification step comprises a request to modify the current quality and to maintain the modified quality. As explained above, by virtue of this first mode, although it is not selected as data source, the stream reader terminal carries on reading, without requesting rendering, for example with a low-quality quality that consumes less bandwidth. According to one variant, the modified quality is maintained for a given duration.

According to another, second particular mode of implementation of the invention, which could be implemented as an alternative or in addition to the previous ones, the modification consists in imposing a bit rate value over the given duration. This mode is easy to implement and is highly effective for reducing the bandwidth consumed by the reading terminal when it is not selected as data source.

In the context of adaptive streaming, a plurality of encoding bit rates are proposed, from lowest to highest. According to another, third particular mode of implementation of the invention, which could be implemented as an alternative or in addition to the previous ones, the imposed bit rate value is chosen from among the lowest bit rates. Since one aim is to reduce the bandwidth occupied by the reading terminal during streaming of the content from a server of the network to the multimedia stream reader terminal, selecting a low bit rate fulfils this requirement.

According to another, fourth particular mode of implementation of the invention, which could be implemented as an alternative or in addition to the previous ones, the modification consists in incrementally reducing the bit rate value over a given duration. In the same way as the second mode, the bit rate value is lowered upon selection of a source other than the reading terminal. An incremental decrease therefore also meets the requirement for reducing bandwidth occupancy. Furthermore, this third mode promotes high-quality rendering in the event of the multimedia flow reader terminal being reselected, for example a few seconds after selection of a source other than the reading terminal. This mode is useful for example when another data source is selected by mistake; following the mistake, for example two or three seconds after another source is selected, the user reselects the data source linked to the reader terminal, which, by virtue of this third mode, renders the content item with a better quality than if the chosen quality were to have been the lowest, as in the second mode.

According to another, fifth particular mode of implementation of the invention, which could be implemented as an alternative or in addition to the previous modes, the modification is performed after a waiting period. This fourth mode takes into consideration a user's right to repent, which user may decide ultimately not to use the new selected source, for example after a few seconds of rendering. This fourth mode makes it possible to carry on streaming in HTTP adaptive streaming mode (HAS), that is to say on the basis of the bandwidth available between the reading terminal and a content server, and thus to render the requested content item with an optimum quality when the user decides to reselect, during this waiting period, the reading terminal as data source.

According to another, sixth particular mode of implementation of the invention, which could be implemented as an alternative or in addition to the previous modes, that after a change of source, an inactivity duration of the user with respect to the reader terminal is calculated and in that, if the activity duration is reached, the electrical state (VL) of the reading terminal is modified. This sixth mode makes it possible to put the content reader terminal into standby beyond an inactivity period; this results in a bandwidth saving and a reduction in electricity consumption.

According to another, seventh sixth particular mode of implementation of the invention, which could be implemented as an alternative or in addition to the previous modes, modifying the operation comprises stopping the reading of the content item. This seventh mode makes it possible to reduce the bandwidth occupied by reading the first content item to a maximum extent.

According to one hardware aspect, an exemplary embodiment of the invention relates to a management entity (MNG) for managing the streaming of a digital content item (C1) within a multimedia content reader terminal (CLTV), in a communication network, said multimedia content reader terminal being able to be a content source (HDMI1) of a rendering terminal (5), said rendering terminal having a plurality of selectable digital content sources (HDMI1, HDMI2), characterized in that it comprises a detection module able, during reading of a first content item by the reader terminal, the content reader terminal being selected by the rendering terminal as digital content source, called first source, to detect selection of a source, called second source, other than the first source, a triggering module able to trigger, when a second content item is rendered instead of the first content item, modification of the operation of the reader terminal in connection with the reading of the first content item. According to another hardware aspect, an exemplary embodiment of the invention relates to a multimedia content reader terminal comprising an entity as defined above.

According to another hardware aspect, an exemplary embodiment of the invention relates to a computer program able to be implemented on a multimedia content reader terminal, the program comprising code instructions that, when it is executed by a processor, performs the steps of the method that are defined in the method defined above.

According to another hardware aspect, an exemplary embodiment of the invention relates to a data medium on which at least one sequence of program code instructions for executing a method as defined above has been stored.

The data medium may be any entity or device capable of storing the program. For example, the medium may include a storage means, such as a RAM memory, a ROM memory, for example a CD-ROM or a microelectronic circuit ROM, or else a magnetic recording means, such as a hard disk. Moreover, the information medium may be a transmissible medium such as an electrical or optical signal, which may be routed via an electrical or optical cable, by radio or by other means. The program according to an exemplary embodiment of the invention may in particular be downloaded from an Internet network. As an alternative, the information medium may be an integrated circuit in which the program is incorporated, the circuit being designed to execute or to be used in the execution of the method in question.

Lastly, it should be pointed out here that, in the present text, the term "module" or "entity" may correspond equally to a software component or to a hardware component or to a set of software and hardware components, a software component itself corresponding to one or more computer programs or subroutines or, more generally, to any element of a program able to implement a function or a set of functions such as described for the modules in question. In the same way, a hardware component corresponds to any element of a hardware assembly able to implement a function or a set of functions for the module in question (integrated circuit, chip card, memory card, etc.).

BRIEF DESCRIPTION OF THE DRAWINGS

The invention will be better understood on reading the following description, which is given by way of example and with reference to the appended drawings, in which:

FIG. 1 shows an architecture for streaming over the Internet based on the use of adaptive streaming according to an exemplary embodiment of the invention;

FIG. 2 schematically illustrates the hardware structure of a real-time multimedia stream reader terminal incorporating a management entity according to one embodiment of the invention;

FIG. 3 shows the main elements of the reader terminal and a schematic view of the various segments of a main content item;

FIG. 4 shows the evolution, according to one embodiment of the invention, of the encoding bit rate used for the main content item, depending on whether the multimedia stream reader terminal is or is not selected as data source in the television set;

FIG. 5 shows the evolution, according to another embodiment of the invention, of the encoding bit rate used for the main content item, depending on whether the multimedia stream reader terminal is or is not selected as data source in the television set;

FIG. 6 shows one possible variant of the embodiments described with reference to FIGS. 4 and 5.

DETAILED DESCRIPTION OF EMBODIMENTS OF THE INVENTION

With reference to FIG. 1, a streaming architecture based on the use of HAS adaptive streaming according to one embodiment of the invention will now be described. It will be noted again here that the invention is not limited to HAS technology, but extends to any other technology for streaming data.

The computer system SYS comprises

A multimedia stream reader terminal CLTV, for example an HDMI key connected to a rendering terminal TV, such as a television set.

A games console CONS.

In our example, the terminal CLTV and the console are connected to two separate ports of the television set TV and are therefore two data sources for the television set TV.

A data source may be selected via a control device such as a remote controller or by way of a smartphone on which a remote control software application for the terminal CLTV is installed.

In our example, the terminal CLTV and the console CONS are located in a local area network LAN controlled via a home gateway GTW. The context of the local area network is given by way of example and could easily be transposed to a best-effort Internet network, to a business network, etc.

The gateway GTW is able to communicate via a telecommunications network RES, such as a wide area network WAN known to those skilled in the art.

A digital content server SRV is located, in this example, in the wide area network WAN, but it could equally well be located in the local area network LAN, for example in the home gateway GTW or any other equipment capable of hosting such a content server.

The content server SRV for example receives channels of digital television content from a television broadcaster, not shown, and/or videos on demand, and makes them available to client terminals.

In our example, the reading terminal CLTV is a client terminal and may, for this purpose, enter into communication with the content server SRV so as to receive one or more content items (films, documentaries, advertising sequences, etc.).

In this client-server context, to exchange data between the client terminal CLTV and the server SRV, an adaptive streaming technique based on the HTTP protocol (HAS) is frequently used. This type of technique makes it possible in particular to offer the user a good content quality while taking into account variations in bandwidth that may occur on the link between the client terminal CLTV and the service gateway GTW, and/or between the latter and the content server SRV.

Conventionally, as will be seen with reference to FIG. 3, one and the same content item of a channel may be encoded with various qualities, for example corresponding to various encoding bit rates. More generally, the term "quality" will be used to refer to a certain resolution of the digital content item (spatial resolution, temporal resolution, quality level associated with the video and/or audio compression) with a certain encoding bit rate. Each quality level is itself divided, in the content server, into temporal segments (or content segments or chunks, these three terms being used indiscriminately throughout this document).

The description of these various qualities and of the associated temporal segmentation, and the content segments, are accessible to the client terminal and made available thereto via their Internet addresses (URI: Universal Resource Identifier). All of these parameters (qualities, addresses of the segments, etc.) are generally grouped together in a parameter file called description file or manifest MNF. It will be noted that this manifest may be a computer file or a set of information items describing the content item, accessible at a certain address.

In an adaptive streaming context, the terminal CLTV may adapt its requests in order to receive and decode the content item requested by the user with the quality that best corresponds thereto. In our example, the content items are available, from lowest to highest, at bit rates of 416 kb/s (kilobits per second) (resolution 1, or level 1, denoted N1), 680 kb/s (N2) and 1200 kb/s (N3); in this configuration, if the client terminal CLTV has available a bandwidth of 3000 kb/s, it may request the content item at any bit rate lower than this limit, 1200 kb/s for example. Generally, content item number i with quality j is denoted "Ci@Nj" (for example the j-th quality level Nj described in the manifest).

The number of encoding bit rates available per segment varies depending on the reading terminal that is used. In FIG. 3, the content item C1 comprises six encoding bit rates per segment, that is to say, from lowest to highest, 416 kb/s, 680 kb/s, 1200 kb/s, 1600 kb/s, 2100 kb/s and 3000 kb/s.

The service gateway GTW is, in this example, a home gateway that routes the data between the wide area network WAN and the local area network LAN and manages the digital content items in particular by receiving them from the network and transmitting them to the reader terminal CLTV.

In this example, to display a content item, the terminal CLTV firstly interrogates the service gateway GTW in order to obtain an address of the manifest MNF of the desired content item (for example C1). The service gateway GTW responds by supplying, to the terminal CLTV, the address of the manifest MNF. It will be assumed hereinafter that this file is a manifest according to the MPEG-DASH standard (which file is denoted "C.mpd"), and the expression "description file" or "manifest" will be referred to indiscriminately depending on the context.

Alternatively, this file may be retrieved directly from a local Internet server or an Internet server external to the local area network, or already be located in the service gateway or in the terminal at the moment of the request.

One example of a manifest (MPD) according to the MPEG-DASH standard and containing the description of content items available in three different qualities (512 kb/s, 1024 kb/s, 2048 kb/s) of the segmented content items is presented in Appendix 1. This simplified manifest describes digital content items in an XML syntax (eXtended Markup Language) and comprises a list of content items in the form of segments conventionally described between a start marker (<SegmentList>) and an end marker (</SegmentList>). The division into segments makes it possible in particular to adapt finely to fluctuations in bandwidth. Each segment corresponds to a certain duration (field "duration") with a plurality of quality levels and allows their addresses (URL—Uniform Resource Locator) to be generated. This generation is performed in this example using "BaseURL" elements ("HTTP://server.com") that indicate the address of the content server and "SegmentURL" elements that list the complementary portions of the addresses of the various segments:

"C1_512kb_1.mp4" for the first segment of the content item "C1" at 512 kilobits per second ("kb") in the MPEG-4 ("mp4") format,
"C1_512kb_2.mp4" for the second segment,
etc.

Once it has the addresses of segments corresponding to the desired content item, the service gateway GTW obtains the segments by download from these addresses. It will be noted that this download is achieved here, conventionally, via an HTTP URL, but could also be achieved via a universal resource indicator (URI) describing another protocol (dvb://mysegmentofcontent for example).

The key CLTV is used to render a television program on the screen of the television set TV. This television program will be referred to by the name content item Cl below. Such a content item C1 is described in a manifest MNF.

As a variant, it will be noted that the content item C1 may be a delayed television program, or a video on demand, or a personal video of the user, or any other multimedia content item of a given duration, to which an exemplary embodiment of the invention also applies.

The content segments obtained via the home gateway GTW are for example transmitted by Wi-Fi® to the key CLTV, which controls their display on the screen of the television set TV in order to render them to the user.

FIG. 2 shows an architecture of a reading terminal, in our example a key CLTV according to one embodiment of the invention.

The key CLTV comprises, as is conventional, memories M associated with a processor CPU. The memories may be ROMs (Read Only Memory) or RAMs (Random Access Memory) or even flash memories. The key CLTV communicates with the local area network LAN and the wide area network WAN via the Wi-Fi module to achieve local wireless communication with the home gateway GTW or another communication terminal of the local area network LAN, the smartphone 3 for example.

The key CLTV comprises an adaptive streaming module HAS suitable for requesting streaming of one of the content items with one of the qualities proposed in a manifest MNF. This manifest MNF may for example be stored in the memories M of the key CLTV or be located elsewhere.

The key CLTV furthermore comprises a management mode MNG whose function will be explained below.

The key CLTV may also contain other modules such as a hard disk, not shown, for storing video segments, a control module for controlling access to the content items, and a processing module for processing commands received from the smartphone.

The key CLTV is connected to a television set TV, via a link HDMI1.

With reference to FIG. 3, the main elements of a key CLTV and a schematic view of a main content item C1 stored in the content server SRV in the form of segments will now be described. More precisely, the content server HAS contains a video C1 in the form of segments or chunks $C1i@Nj$ that are encoded at various encoding bit rates Nj, where the index i denotes a temporal identifier of the chunk $C1i@Nj$.

In the prior art, the streaming module HAS of the key CLTV is responsible for retrieving the chunks from the content server HAS by choosing the video quality Nj depending on the available network resource. The way in which the streaming module HAS chooses the encoding bit rate of the next video segment to be streamed will not be described in detail here: indeed, there are many algorithms allowing this choice to be made, the security and aggressiveness of the strategies of which vary. It will however be recalled that, more often than not, the general principle of such algorithms is based on streaming a first segment at the lowest encoding bit rate proposed in the manifest, and on evaluating the time taken to retrieve this first segment. On this basis, the streaming module HAS evaluates whether, depending on the size of the segment and on the time taken to retrieve it, the network conditions allow the following chunk to be streamed at a higher encoding bit rate. Certain algorithms are based on a gradual increase in the quality level of the streamed content segments; others propose more risky approaches, with jumps in the levels of the encoding bit rates of successive segments.

In the conventional case, if a video chunk lasts 3 seconds, the retrieval of the chunk by the streaming module HAS must not take more than 3 seconds, in order to allow the content item to be rendered by the key CLTV without interruption. It is therefore necessary for the streaming module HAS to find the best compromise between a rendering quality, and therefore an encoding bit rate, which must be as high as possible, and the time taken to stream the segment, which must be low enough to allow continuous rendering on the television set TV.

In the embodiment illustrated in FIG. 3, the streaming module HAS commands the streaming of a segment at the optimum encoding bit rate as described in detail below.

Initially, the module HAS retrieves the manifest MNF that corresponds to the video content item C1 in order to discover the available segments of the video content item C1, and the various associated video qualities Nj. In the example of FIG. 3, the content item C1 is for example available in the form of segments of a duration of 3 s, with a first encoding bit rate N1=416 kb/s, a second encoding bit rate N2=680 kb/s, a third encoding bit rate N3=1200 kb/s, etc.

In a normal operating mode, not illustrated in FIG. 3, the module HAS for example streams the successive segments $C11@N1$ (that is to say the first temporal segment at an encoding bit rate of 416 kb/s), then $C12@N3$ (that is to say the second temporal segment at an encoding bit rate of 1600 kb/s), and then C13@N3 (that is to say the third temporal segment at an encoding bit rate of 1200 kb/s), etc.

The various segments streamed by the streaming module HAS are transmitted to an interface module INT in order to be rendered to the user on the screen of the television set TV. The module INT manages the interface with the television set TV, via which it for example obtains information about any interactions of the user with the television set TV (action on the remote control of the television set, for example a press on the volume button or a button for changing channel), and via which it may control the display on the screen of the television set TV of a requested content item, for example a television channel or a navigation interface, concomitantly.

The algorithm implemented by the streaming module HAS to determine which segment should be streamed at which encoding bit rate in normal operating mode may be one of the algorithms already known in the prior art. This algorithm will therefore not be described in more detail here.

As indicated above, the terminal CLTV and the console are connected to the television set TV via respective ports HDMI1/HDMI2, representative of different data sources.

A selection module present in the television set may select a port individually and render a content item coming from the data source connected to the port in question.

When the terminal CLTV is currently being used and the terminal is selected as data source in the television set TV, a multimedia content item originating from the reader terminal CLTV may be rendered on the screen of the television set.

During this rendering, a user may wish to play on the console CONS. In this case, the user uses their remote controller and selects a data source other than the one used by the terminal CLTV, specifically, in our example, the data source HDMI2.

According to one embodiment of the method of the invention, the steps are as follows when the stream reader terminal is selected as data source HDMI1, called first data source:

a step of detecting selection of a source HDMI2, called second source, other than the first source HDMI1, followed by a step of selecting an encoding bit rate independently of the available bandwidth and of maintaining said modified bit rate for a given duration.

In our example, these steps are implemented by the management module MNG introduced above. The management module may be at any location; in our example, this management module is located in the reading terminal CLTV.

In other words, the management module MNG forces the streaming module HAS to use a particular encoding bit rate for a given time period. In our example, the modification consists in reducing the current bit rate, for example to 416 kb/s, if said bit rate is greater than a threshold encoding bit rate, for example 680 kb/s.

FIGS. 4 and 5 illustrate, on a time axis, the evolution of the encoding bit rate at three times, specifically: at a first time, when the key CLTV is being used as data source; at a second time, when the key CLTV is no longer being used as data source, another data source having been selected on the television set; the streaming module HAS of the key CLTV at the same time continuing to stream the segments; and a third time, when the key CLTV is again being used as data source.

When the selected data source is the key CLTV, the module HAS selects the encoding bit rate according to the HAS method described above, based on the bandwidth between the reader terminal CLTV and the server SRV.

By contrast, when a data source other than the source associated with the key is selected, the streaming module HAS of the key CLTV carries on streaming the segments under the control of the management module MNG, which will force the streaming module to select the encoding bit rate for the segments, independently of the bandwidth.

In FIG. 4, and with reference to FIG. 3, it is also assumed that, at a time t, the terminal CLTV is used as data source by the television set TV, which successively receives segments of the content item C1 with qualities of 416 kb/s, 680 kb/s and 1600 kb/s from the server SRV.

At a time t1, another data source HDMI2 is selected with the remote controller TCD.

At this time t1, the console CONS becomes the data source for the television set via the port HDMI2; and the key CLTV continues to stream the segments.

The management module MNG detects this change and requests modification of the selection of the segments. In our example, the modification consists in selecting an encoding bit rate from among the lowest ones for the upcoming segments. In our example, the chosen bit rate is the lowest bit rate proposed, specifically 416 kb/s. In FIG. 3, the 3 upcoming segments shown in the figure are the segments C14@N1, C15@N1 and C16@N1; all of these segments are selected with the bit rate N1 equal to 416 kb/s.

In summary, when the terminal CLTV is no longer a data source for the television set TV, the management model MNG asks the streaming module HAS to stream segments with a bit rate of only 416 kb/s. The streaming module HAS then stops streaming the segments on the basis of the available resources, as explained above.

It will be assumed that, at a time t2, the user reselects the port HDMI1. The key CLTV becomes the data source for the television set TV again.

It will be assumed that, at a time t2, when the current bit rate is 416 kb/s, the user reselects the port HDMI1. The key CLTV becomes the data source for the television set TV again.

At this time t2, the management module MNG asks the streaming module HAS to resume normal operation. The streaming module HAS again retrieves segments from the HAS content server in a known manner by choosing the video quality Nj on the basis of the available network resource.

At this time t2, the terminal CLTV carries on reading with a bit rate of 416 kb/s; the content item is then rendered by the television set TV with this bit rate.

After receiving the segment at 416 kb/s, the streaming module HAS resumes its normal HAS streaming operation, and determines the bit rate to be used on the basis of the available network resources.

At a time t3, the reader terminal CLTV streams the content item with a bit rate at 680 kb/s and, later on, at 1600 kb/s.

FIG. 5 illustrates a variant in which, at the time t1, the management module MNG manages the selection of the bit rates not by selecting the lowest encoding bit rate, but by asking the module HAS to incrementally decrease the encoding bit rate, preferably in a degressive manner.

In the same way as in FIG. 4, is also assumed that, at a time t, the key CLTV is being used as data source by the television set TV, which successively receives segments of the content item C1 with qualities of 416 kb/s, 680 kb/s and 1600 kb/s from the server SRV.

At a time t1, another data source HDMI2 is selected with the remote controller TCD. At this time, the console CONS becomes the data source for the television set via the port HDMI2; and the key CLTV continues to stream the segments. The segments received by the key are not rendered, since the key is not selected as data source on the television set.

The management module MNG detects this change and requests modification of the selection of the segments.

In our example, the modification consists, for the streaming module HAS, in gradually decreasing the bit rate; in our example, the decrease is performed incrementally.

For example, after detecting the change of source at the time t1, the streaming module HAS will initially retrieve segments having a bit rate of 1200 kb/s; later on, the streaming module HAS reduces the bit rate to 680 kb/s.

It will be assumed that, at a time t2, when the current bit rate is 680 kb/s, the user reselects the port HDMI1. The key CLTV becomes the data source for the television set TV again.

At this time t2, the terminal CLTV carries on reading with a bit rate of 680 kb/s; the content item is then rendered by the television set TV with this bit rate.

Following the reception of the segment at 680 kb/s, the streaming module HAS estimates the optimum bit rate on the basis of normal HAS streaming operation, specifically on the basis of the available network resources.

At a time t3, the reader terminal CLTV streams the content item with a bit rate at 1600 kb/s.

This variant is beneficial if a data source, in this case HDMI2, is selected by mistake. Following this mistake, a user will probably reselect the source HDMI1 and will want to see a content item rendered with a better quality (680 kb/s) than when the bit rate is chosen to be as low as possible (416 kb/s). Indeed, by comparing this variant with the previous one, in the first variant, at the time t2, the key CLTV retrieves a stream with an encoding bit rate at 416 kb/s, the lowest one; the rendering quality is the worst. By contrast, in the second variant, the key CLTV retrieves a stream having an encoding bit rate P2 of better quality than for the first variant, specifically 680 kb/s rather than 416 kb/s.

According to another variant, during the phases in which the key CLTV is currently streaming a segment while no data source other than the key CLTV is being used, an inactivity period T may be defined at the end of which the key CLTV may be put into standby VL or powered off. In our example, with reference to FIG. 6, the key CLTV is put into standby at a time tvl.

It should be noted that a first inactivity period may be defined when the key CLTV is selected as data source, and a second inactivity period may be defined when the HDMI key, although operating, is not selected as data source. For example, the first inactivity period may be three hours and the second inactivity period may be 5 minutes.

According to another variant, the modification, whether it is performed by imposing a given bit rate or whether it is performed incrementally, is performed after a waiting period. This fourth mode takes into account the user's right to repent, which user may decide ultimately not to use the new selected source, for example after a few seconds of rendering. This fourth mode makes it possible to carry on streaming in HTTP adaptive streaming mode (HAS), that is to say on the basis of the bandwidth available between the reading terminal and a content server, and thus to render the requested content item with an optimum quality when the user decides to reselect, during this waiting period, the reading terminal as data source.

APPENDIX 1

```
<?xml version="1.0"?>
<MPD xmlns:xsi="http://www.w3.org/2001/XMLSchema-instance"
   xmlns="urn:mpeg:DASH:schema:MPD:2011"
   xsi:schemaLocation="urn:mpeg:DASH:schema:MPD:2011 DASH-MPD.xsd"
   type="dynamic" profiles="urn:mpeg:dash:profile:isoff-live:2011">
   <Representation id="0" codecs="avc1" mimeType="video/mp4"
   width="1024" height="768" startWithSAP="1" bandwidth="46986">
<BaseURL>HTTP://server.com/</BaseURL>
<!-- Contenu C1 à N1=512kb -->
<SegmentBase>
    <Initialization sourceURL="C1_15sec_512kb/C1_512kbit_dash.mp4"/>
</SegmentBase>
<SegmentList duration="10">
    <SegmentURL media="C1_512kb_1.mp4"/>
    <SegmentURL media=" C1_512kb _2.mp4"/> ....
</SegmentList>
<!-- Contenu C1 à N2=1024kb -->
<SegmentBase>
    <Initialization sourceURL="C1_15sec_500kbit/C1_1024kbit_dash.mp4"/>
</SegmentBase>
<SegmentList duration="10">
    <SegmentURL media="C1_512kb_1.mp4"/>....
</SegmentList>
<!-- Contenu C1 a N3=2048kb -->
<SegmentBase>
    <Initialization sourceURL="C1_15sec_512kb/C1_2048kbit_dash.mp4"/>
</SegmentBase>
<SegmentList duration="10">
    <SegmentURL media="C1_2048kb _1.rnp4"/>...
</SegmentList>
<!-- Contenu C2 a N1=512kb -->
<SegmentBase>
    <Initialization sourceURL=" C2_15sec_500kbit/C2_512kbit_dash.mp4"/>
</SegmentBase>
<SegmentList duration="10">
    <SegmentURL media=" C2_512kb_1.mp4"/>....
</SegmentList>
```

APPENDIX 1-continued

```
<!-- Contenu C2 a N2=1024kb -->
<SegmentBase>
    <Initialization sourceURL="C2_15sec_500kbit/C1_1024kbit_dash.mp4"/>
</SegmentBase>
<SegmentList duration="10">
    <SegmentURL media="C2_1024kb_1.mp4"/>....
</SegmentList>
<!-- Contenu C2 a N3=2048kb -->
<SegmentBase>
    <Initialization sourceURL="C2_15sec_500kbit/C1_2048kbit_dash.mp4"/>
</SegmentBase>
<SegmentList duration="10">
    <SegmentURL media="C1_2048kbit_1.mp4"/>...
</SegmentList>
  ....
</SegmentList>
</MPD>
```

Although the present disclosure has been described with reference to one or more examples, workers skilled in the art will recognize that changes may be made in form and detail without departing from the scope of the disclosure and/or the appended claims.

The invention claimed is:

1. A management method for managing streaming of at least one digital content item within a multimedia content reader terminal, from a communication network, said multimedia content reader terminal being able to be a content source of a rendering terminal, said rendering terminal having a plurality of selectable digital content sources, the at least one digital content item having a plurality of available encoding bit rates associated with respective rendering qualities, wherein the method comprises implementing the following acts:
  in response to the content reader terminal being selected as digital content source, called first source, reading a first of the at least one digital content item and supplying the first content item to the rendering terminal to be rendered,
  detecting, during the reading of the first content item by the reader terminal, selection of a source, called second source, other than the first source,
  the detecting triggering:
    reading both the first and a second of the at least one digital content item at given respective bit rates on the basis of a bandwidth available on the communication network, the second content item originating from the second source,
    supplying the second content item to the rendering terminal instead of the first content item, and
    after a waiting period from the detecting, modifying an operation of the reader terminal in connection with the reading of the first content item comprising requesting to impose a bit rate value for reading the first content item and to maintain the imposed bit rate value for a given duration.

2. The management method as claimed in claim 1, wherein the imposed bit rate value is chosen from among the lowest bit rates.

3. The management method as claimed in claim 1, wherein the modification comprises incrementally reducing the bit rate value over a given duration.

4. The management method as claimed in claim 1, comprising, after a change of source, calculating an inactivity duration of a user with respect to the reader terminal and, if the inactivity duration is reached, modifying an electrical state of the reading terminal.

5. The management method as claimed in claim 1, wherein modifying the operation comprises stopping the reading of the first content item.

6. A management entity for managing streaming of at least one digital content item within a multimedia content reader terminal, in a communication network, said multimedia content reader terminal being able to be a content source of a rendering terminal, said rendering terminal having a plurality of selectable digital content sources, the at least one digital content item having a plurality of available encoding bit rates associated with respective rendering qualities, wherein the management entity comprises:
  a processor; and
  a non-transitory computer-readable medium comprising instructions stored thereon which when executed by the processor configure the management entity to:
  in response to the content reader terminal being selected as digital content source, called first source, read a first of the at least one digital content item and supply the first content item to the rendering terminal to be rendered,
  detect selection of a source, called a second source, other than the first source, during the reading of the first content item by the reader terminal, and
  trigger, in response to the selection of the second source:
    reading both the first and a second of the at least one digital content item at given respective bit rates on the basis of a bandwidth available on the communication network, the second content item originating from the second source,
    supplying the second content item to the rendering terminal instead of the first content item, and
    after a waiting period from the detecting, modifying an operation of the reader terminal in connection with the reading of the first content item comprising requesting to impose a bit rate value for reading the first content item and to maintain the imposed bit rate value for a given duration.

7. The management entity of claim 6, wherein the management entity is implemented in the multimedia content reader terminal.

8. A non-transitory computer-readable medium comprising instructions stored thereon which when executed by a processor of a multimedia content reader terminal configure the multimedia content reader terminal to manage streaming of a at least one digital digital content item within the multimedia content reader terminal, from a communication network, said multimedia content reader terminal being able to be a content source of a rendering terminal, said rendering terminal having a plurality of selectable digital content sources, the at least one digital content item having a plurality of available encoding bit rates associated with respective rendering qualities, wherein the managing comprises implementing the following acts:
- in response to the content reader terminal being selected as digital content source, called first source, reading a first of the at least one digital content item and supplying the first content item to the rendering terminal to be rendered,
- detecting, during the reading of the first content item by the reader terminal, selection of a source, called second source, other than the first source,
- the detecting triggering:
  - reading both the first and a second of the at least one digital content item at given respective bit rates on the basis of a bandwidth available on the communication network, the second content item originating from the second source,
  - supplying the second content item to the rendering terminal instead of the first content item, and
  - after a waiting period from the detecting, modifying an operation of the reader terminal in connection with the reading of the first content item comprising requesting to impose a bit rate value for reading the first content item and to maintain the imposed bit rate value for a given duration.

\* \* \* \* \*